United States Patent [19]

Pimm

[11] Patent Number: 5,431,828
[45] Date of Patent: Jul. 11, 1995

[54] LIQUID SEPARATING METHOD AND APPARATUS

[76] Inventor: Gareth W. Pimm, 10 Cherimoya Gardens, West Molesey, Surrey, KT8 9SA, United Kingdom

[21] Appl. No.: 117,118
[22] PCT Filed: Mar. 23, 1992
[86] PCT No.: PCT/GB92/00528
  § 371 Date: Nov. 16, 1993
  § 102(e) Date: Nov. 16, 1993
[87] PCT Pub. No.: WO92/16278
  PCT Pub. Date: Oct. 1, 1992

[30] Foreign Application Priority Data

Mar. 21, 1991 [GB] United Kingdom ............... 9105999

[51] Int. Cl.⁶ .............................................. C02F 1/40
[52] U.S. Cl. .............................. 210/776; 210/799; 210/242.3; 210/923; 210/519
[58] Field of Search ............. 210/767, 800, 294, 195.1, 210/242.1, 538, 540, 776, 511, 703, 242.3, 923, 776, 799, 519; 417/160, 172

[56] References Cited

U.S. PATENT DOCUMENTS

| | | | |
|---|---|---|---|
| 1,930,006 | 10/1933 | Fox | 210/511 |
| 3,106,529 | 10/1963 | Van Deer Meer | 210/511 |
| 3,374,893 | 3/1968 | Stretton | 210/242.1 |
| 3,726,406 | 4/1973 | Damberger | 210/923 |
| 3,745,115 | 7/1973 | Olsen | 210/800 |
| 3,794,175 | 2/1974 | Stewart | 210/242 |
| 3,884,810 | 5/1975 | Smyrnow | 210/242.3 |
| 3,962,093 | 6/1976 | Gibson | 210/242.3 |
| 4,753,633 | 6/1988 | Callegari, Sr. et al. | 210/374 |
| 5,108,600 | 4/1992 | Rees et al. | 210/242.3 |

FOREIGN PATENT DOCUMENTS 2500431 8/1982 France.
2202758 10/1988 United Kingdom.

*Primary Examiner*—Robert A. Dawson
*Assistant Examiner*—Ana M. Fortuna

[57] ABSTRACT

A method for the separation of a less dense liquid from a body of a more dense liquid on which the less dense liquid is floating, especially for the separation of oil floating on water, which includes passing a column of liquid at high velocity substantially vertically from within the body of liquid through the surface thereof thereby to entrain the less dense liquid and carry it away from the surface, and collecting the mixture of less dense liquid and other liquid(s) thereby produced. The apparatus for use in the invention includes a mechanism for generating a high velocity column of carrier liquid, a mechanism for directing the column upwardly through the body of liquid and the floating layer of less dense liquid to entrain the less dense liquid in a surface layer of the column and a device for directing the carrier liquid and entrained less dense liquid to a collector device. The directing device may comprise, for example, a spreader device with an outwardly and upwardly flared portion which diverts the liquid mixture to an annular collector or it may comprise a mushroom-shaped surface for directing the liquid mixture into a collector surrounding the support rod.

8 Claims, 2 Drawing Sheets

LIQUID SEPARATING METHOD AND APPARATUS

FIELD OF THE INVENTION

This invention relates to a method and apparatus for separating immiscible liquids of differing specific quantities and more especially for separating a surface layer of liquid of lower density from a body of liquid of higher density on which it is floating. The invention is especially suited to the removal of floating oil from the surface of water.

SUMMARY OF THE INVENTION

The invention provides a method for the separation of a less dense liquid from a body of a more dense liquid on which it is floating, which comprises passing a column of liquid at high velocity substantially vertically from within the body of liquid through the surface thereof and collecting the mixture of less dense liquid and other liquids thereby produced.

The invention also provides an apparatus for the separation of a less dense liquid from a body of more dense liquid on which it is floating, which comprises means for generating a high-velocity column of carrier liquid, means for directing said column upwardly through the body of liquid and the floating layer of less dense liquid, whereby a layer of less dense liquid is entrained by the surface of the column of carrier liquid, and means for directing said carrier liquid and entrained less dense liquid to a collector device.

According to a first embodiment of the invention, the apparatus comprises a support rod which at one end has an outwardly and upwardly flared portion defining a spreader device and at the other end is surrounded by a coaxial tube which is spaced from the rod to define an annular passage which terminates at a point spaced from the narrowest point of the spreader device, means for connecting the tube to means for pumping a carrier liquid through the annular passage towards the spreader device and a collector positioned below the spreader device and having an aperture in its base to receive the support rod and allow passage of the column of carrier liquid.

In operation of the apparatus, the apparatus is supported relative to the body of liquid so that the lower end of the support rod and its surrounding tube are below the surface and the spreader device and the collector are above the surface. A carrier liquid is pumped into the lower end of the annular passage. It exits at the upper end of the annular column surrounding the support rod to impinge on the spreader device. As the column of liquid breaks through the surface it entrains the adjacent surface layer which is carried upwards as a liquid skin surrounding the column. On contracting the flared surface of the spreader device the column is directed outwardly over the collector and is collected therein as a mixture of the surface layer of the body of liquid, including floating contaminants, and carrier liquid.

The mixture of liquids from the collector may then be transferred to means for effecting further separation as desired.

Since the withdrawn surface layer is continuously replaced continued operation of the apparatus will clear contaminants from the surface of a body of liquid over a wide area and moreover since the operation of the apparatus creates a surface current towards the column of liquid non-liquid floating contaminants can also be removed provided that they are not too massive to be transferred to the collector by the column of liquid.

The surface of the spreader device may be of any continuously expanding shape and may for example be a conical or preferably a cuspoidal surface. There should preferably be a gentle transition from the support rod to the spreader device to avoid abrupt changes in direction of the column of liquid with the consequent risk of splashing.

Preferably the spreader device has a reentrant portion in its peripheral region to deflect the liquid downwardly into the collector but this may not be necessary if the extent of the surface of the spreader device relative to the collector is such that the reduction in momentum of the liquid over the surface is such that gravity will cause the liquid to fall into the collector.

According to a second embodiment of the invention the apparatus comprises a support rod carrying at one end a diverter device having an outwardly and downwardly curved surface facing the rod, a first tubular portion coaxially surrounding the rod and spaced therefrom to define a collector device, a second tubular portion surrounding a lower part of the first tubular portion and spaced therefrom to provide an annular passage which terminates at a level below the diverter device, and means for forcing liquid through the annular passage to impinge on the curved surface of the diverter device to be diverted inwardly towards the support rod and into the collector device.

In the second embodiment the curved surface of the diverter device is preferably a Coanda surface and means associated with the diverter device are arranged to create a flow of fluid over the surface from out-to-in to assist in directing the impinging liquid towards the support rod. The diverter device may, for example, be formed with internal fluid transmitting passageways from which fluid issues at high velocity onto the surface in an annular region outward of the region of impingement of the carrier liquid.

After start up of the apparatus, the mixture of liquids from the collector may be recycled as the carrier liquid.

This mode of operation has the main advantage that it results overall in a lesser amount of liquid being collected for later further separation. Also because of the higher affinity of like liquids for one another it can result in a higher amount of the less dense liquid being collected at the expense of the more dense.

The apparatus and method of the invention is particularly suitable for separating oil or other floating contaminants from water and is operable in sea or fresh water. It has particular significance in the clearance of oil spills.

The apparatus may, for example, be carried on a ship or boat, for example, on a boom or outrigger or, especially when operating in recycling mode may simply be allowed to float on the surface of the water, with the collector providing buoyancy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The invention will now be described in greater detail by way of example with reference to the drawings which show schematically two forms of apparatus according to the present invention.

Figure 1:
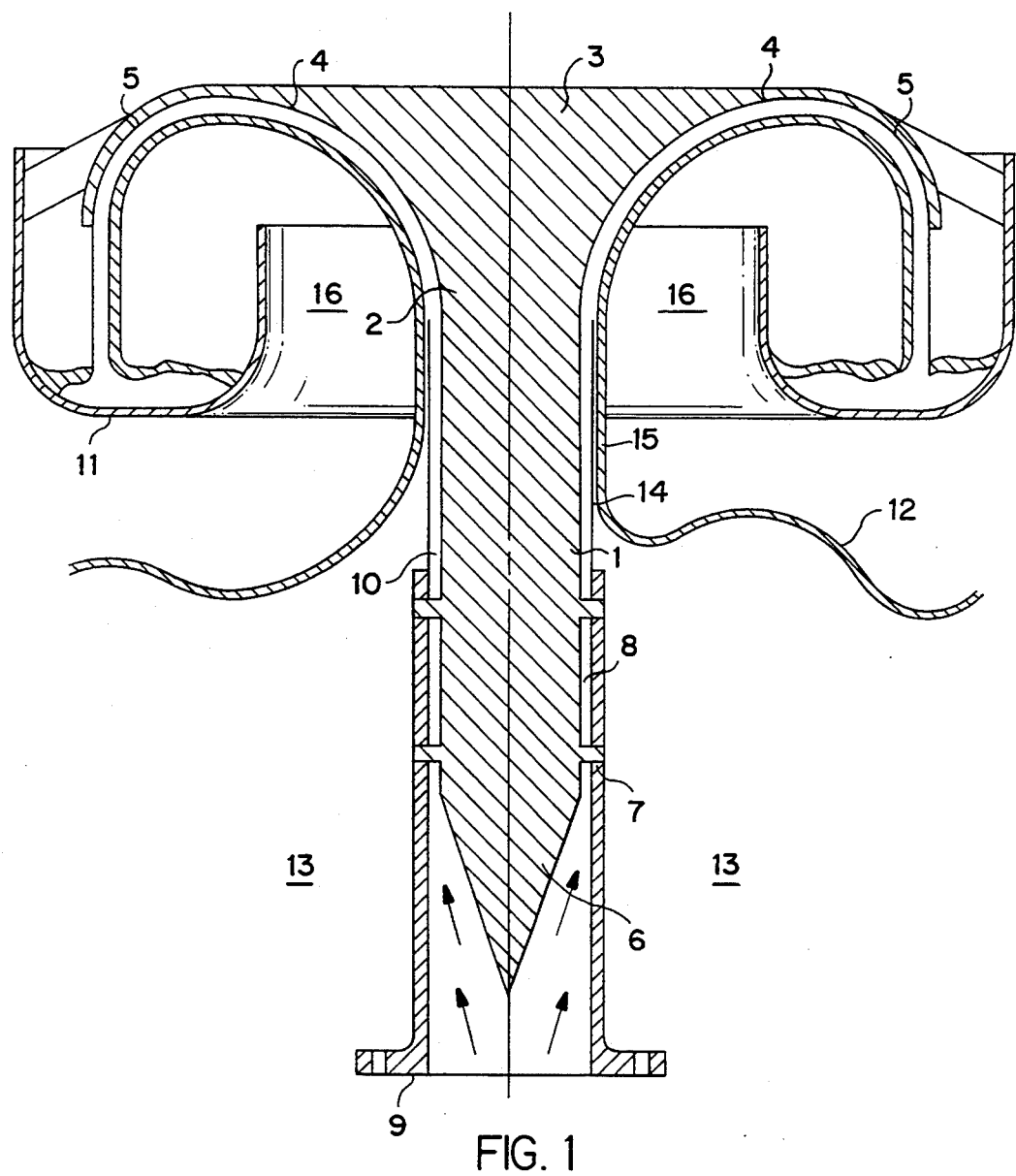
FIG. 1 is a sectional view of an apparatus for separating a surface layer of a less dense liquid from a body of more dense liquid on which the less dense fluid is floating, according to one embodiment of the present invention.

Referring to FIG. 1, the apparatus comprises a support rod 1 of circular section carrying on its upper end 2 a symmetrically arranged spreader device 3. The spreader device 3 has a cuspoidal surface 4 which flares outwardly from the rod 1. Rod 1 and the spreader device 3 may be formed integrally, if desired. In the peripheral region of the spreader device 3 the surface is reentrant and turns back on itself to extend substantially vertically downwards.

The lower end 6 of rod 1 is pointed to reduce turbulence in liquid flowing past it and is surrounded by a tube 7 which is coaxial with and spaced from the support rod 1 leaving an annular passage 8 between the rod 1 and the tube 7. The lower end 9 of the tube 7 is connected by, for example, a flexible pipe (not shown) which is in turn connected to a pump (also not shown) for pumping liquid through the passage 8. The tube 7 is mounted relative to the rod 1 by a spider (not shown) or other means designed to introduce as little turbulence as possible.

The upper end 10 of the passage 8 is spaced from the lower end of the spreader device 3.

An annular collector 11 is mounted by means (not shown) such as to remove liquid falling downwardly from the surfaces 4 or 5 or the spreader device 3. The collector 11 is mounted coaxially relative to the spreader device 3 by means arranged to disrupt the flow of liquid as little as possible and preferably not at all.

In operation of the apparatus to, for example, remove a surface layer 12 of oil from a body 13 of sea water, the apparatus is supported by means (not shown) such that the upper end 10 of the passage 8 is below the surface of the sea water 13 and the spreader device 3 is above the surface.

Water is pumped to the lower end of the tube 7. The water enters the passage 8 at increased pressure and emerges from the upper end 10 as an annular column of water at high velocity. The column breaks through the surface layer 12 of oil and carries with it the adjacent surface oil as a skin 15. The annular column of water 14 passes through the coaxial aperture 16 of the collector 11 and on reaching the spreader device 3 is directed outwardly over the surface 4, it is then directed into the collector 11 by the centriant surface portion 5.

The collector 11 receives a mixture of oil and water, the water component comprising the carrier water and some sea water from the body of water 13. The mixture from the collector 11 may be transferred continuously or intermittently to further separation means preferably for obtaining at least substantially pure water to be returned direct to the sea or it may be recycled through the apparatus in place of the carrier water used for start-up.

Figure 2:
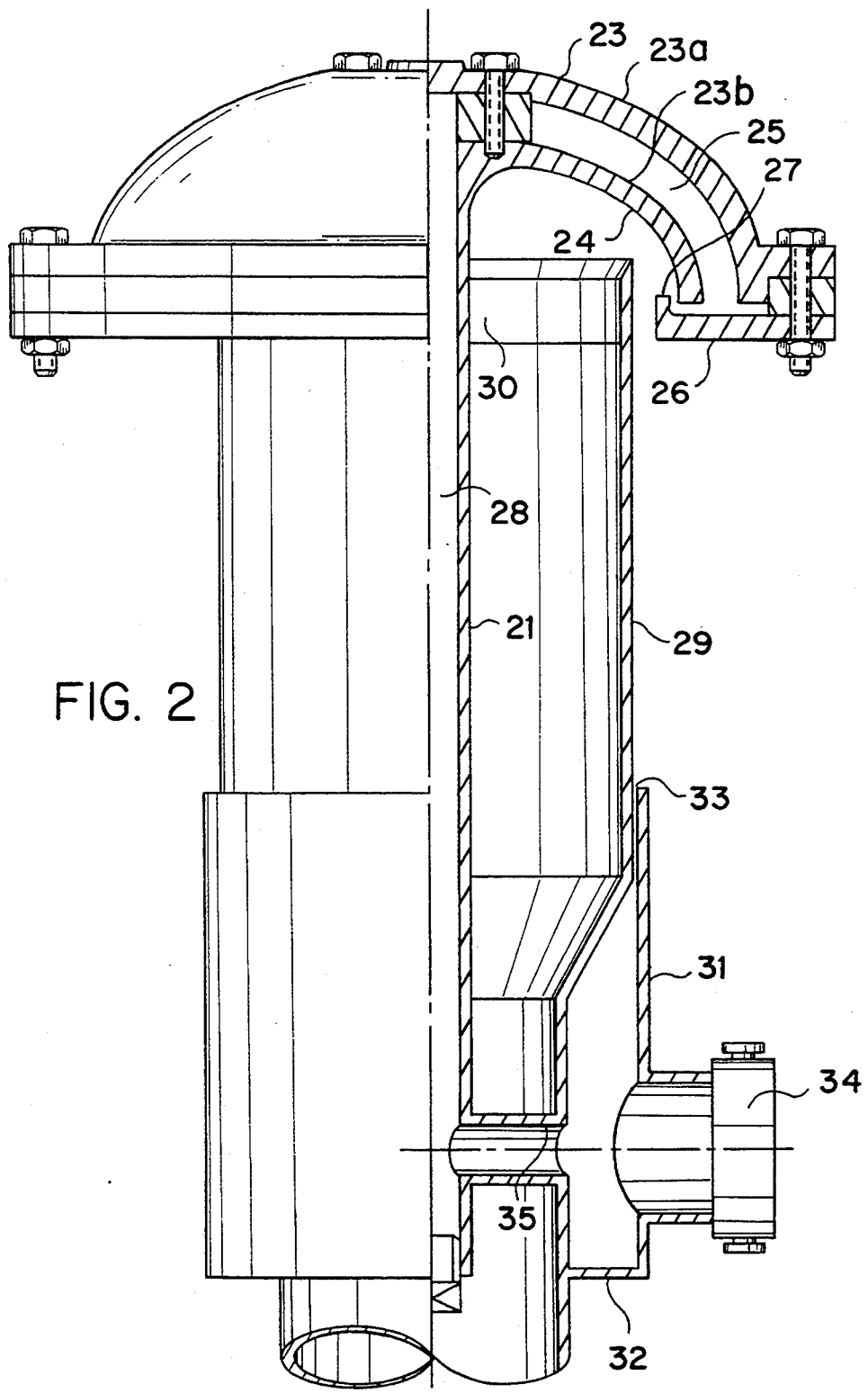
FIG. 2 is a partial sectional view of an apparatus for separating a surface layer of a less dense liquid from a body of more dense liquid on which the less dense fluid is floating, according to a second embodiment of the present invention.

With respect to FIG. 2, the second form of apparatus comprises a support rod 21 which at its upper end carries a mushroom-shaped diverter device. 23, the surface 24 of which facing the rod 21 is a Coanda surface.

The diverter device 23 is formed by two spaced apart shelves 23a and 23b. The space between the shelves 23a and 23b defines a liquid feed passage 25 which at the periphery of the device is partially blocked by a plate 26 arranged to define an annular liquid exit passage 27 for directing the liquid onto the Coanda surface 24.

Support rod 21 has a bore 28 in communication with the passage 25.

The support rod 21 supports a coaxial generally cylindrical collecting chamber 29 which is of such length as to terminate at its upper end within the confines of the diverter device 23.

Surrounding the lower end of the collecting chamber 29 is a coaxial sleeve 31 which at its lower end 32 is sealed to the collecting chamber 29 and at its upper end 33 defines, with the wall of the collecting chamber 29, an annular exit passage for fluid fed into the sleeve through an inlet 34. A portion of the liquid fed into sleeve 31 is passed via passage 35 to the bore 28 in rod 21.

In operation of the apparatus the apparatus is supported with end 33 of sleeve 31 below the surface of a body of, for example, sea water having a floating oil layer. Diverter device 23 is above the surface of the water.

Liquid, which may be sea water, is pumped at high pressure through inlet 34 and, as described in relation to FIG. 1, forms an annular column of liquid which on passage through the floating oil entrains oil on its surface and carries the oil upwardly.

Part of the liquid pumped through inlet 34 passes at high pressure up rod 21 through passage 25 and onto plate 26 from where it is diverted to pass through the exit passage 27 to flow over the Coanda surface 24.

The liquid column with entrained oil impacts on the Coanda surface 24 and is diverted inwardly towards the rod 21 by the action of the liquid layer flowing on the surface 24. The liquid mixture is collected in a collecting chamber 29.

I claim:

1. A method for the separation of a less dense liquid from a body of a more dense liquid on which the less dense liquid is floating, comprising the steps of:
   passing an annular column of liquid at high velocity substantially vertically upward from within the body of liquid through a surface thereof thereby to entrain said less dense liquid and to carry said less dense liquid upward away from the surface;
   and collecting the mixture of less dense liquid and more dense liquid thereby produced.

2. The method according to claim 1 wherein there is used an apparatus comprising:
   means for generating said high-velocity column of carrier liquid, means for directing said column of carrier liquid upwardly through and in contact with the body of liquid and the floating layer of said less dense liquid, whereby a layer of less dense liquid is entrained by a surface of the column of carrier liquid; and means for directing said carrier liquid and entrained less dense liquid to a collector device.

3. An apparatus for the separation of a less dense liquid from a body of more dense liquid on which the less dense liquid is floating, comprising:

means for generating a high-velocity column of carrier liquid;

means for directing said column of carrier liquid upwardly through and in contact with the body of liquid and the floating layer of said less dense liquid, whereby a layer of less dense liquid is entrained by a surface of the column of carrier liquid; and means for directing said carrier liquid and entrained less dense liquid to a collector device.

4. The apparatus according to claim 3, comprising a support rod which at one end has an outwardly and upwardly flared portion defining a spreader device and at another end is surrounded by a coaxial tube which is spaced from the rod to define an annular passage which terminates at a point spaced from a narrowest point of the spreader device, means connecting the coaxial tube to means for pumping a carrier liquid through the annular passage towards the spreader device and a collector positioned below the spreader device and having an aperture in its base to receive the support rod and allow passage of the column of carrier liquid.

5. The apparatus according to claim 4 wherein the spreader device has a re-entrant portion in its peripheral region to deflect liquid downwardly into the collector.

6. The apparatus according to claim 3 further comprising, a support rod carrying at one end a diverter device having an outwardly and downwardly curved surface facing the rod, a first tubular portion coaxially surrounding the rod and spaced therefrom to define a collector device, a second tubular portion surrounding a lower part of the first tubular portion and spaced therefrom to provide an annular passage which terminates at a level below the diverter device, and means for forcing liquid through the annular passage to impinge on the curved surface of the diverter device to be diverted inwardly towards the support rod and into the collector device.

7. The apparatus according to claim 6 wherein the curved surface of the diverter device is a Coanda surface.

8. The apparatus according to claim 6 wherein means associated with the diverter device are arranged to create a flow of fluid over the surface from out-to-in, to assist in directing the impinging liquid towards the support rod.

* * * * *